United States Patent [19]
Chen et al.

[11] Patent Number: 5,946,703
[45] Date of Patent: Aug. 31, 1999

[54] METHOD FOR READING DATA IN DATA READING AND WRITING SYSTEM

[75] Inventors: Michael T. H. Chen; Joseph Chen, both of Hsinchu, Taiwan

[73] Assignee: Silicon Integrated Systems Corp., Taiwan

[21] Appl. No.: 08/797,007

[22] Filed: Feb. 7, 1997

[51] Int. Cl.[6] .................................................. G06F 12/00
[52] U.S. Cl. ...................... 711/105; 711/201; 365/203; 365/233; 365/230.06
[58] Field of Search ................................... 711/201, 105; 365/203, 233, 230.06

[56] References Cited

U.S. PATENT DOCUMENTS

| | | | |
|---|---|---|---|
| 5,021,951 | 6/1991 | Baba | 711/201 |
| 5,713,006 | 1/1998 | Shigeeds | 395/653 |
| 5,724,553 | 3/1998 | Shigeeds | 365/230.06 |
| 5,734,204 | 3/1998 | Sobue | 307/65 |

*Primary Examiner*—John W. Cabeca
*Assistant Examiner*—Mehdi Namazi

[57] ABSTRACT

A method for reading data in a data reading and writing system is disclosed. The method can effectively shorten the data-reading cycle. The method comprises the steps of: (1) providing a clock signal for serving as a pulse source of a synchronous signal for the data reading and writing system; (2) providing an enable signal for activating the data reading and writing system into a data reading cycle; (3) providing an address signal and decoding the address signal into a memory address signal; (4) comparing addresses of two successive memory address signals to obtain a comparison signal; (5) providing a column address strobe and a row address strobe for obtaining a memory address from the memory address signal, wherein the step of comparing addresses of two successive memory address signals and the step of obtaining a memory address are executed at the same time; (6) allowing the data reading and writing system to output a memory data output in response to the obtainment of the memory address; and (7) repeating steps (2), (3) and (5) till the data reading procedure is completed.

16 Claims, 2 Drawing Sheets

METHOD FOR READING DATA IN DATA READING AND WRITING SYSTEM

FIELD OF THE INVENTION

The present invention relates to a method for reading data in a data reading and writing system, and more particularly to a method for shortening the time for reading data in a computer system.

BACKGROUND OF THE INVENTION

With respect to the CPU of the personal computer, 60% out of all cycles are read cycles. It means that the length of the read cycle is a dominant factor for the performance of the system (especially for the speed performance). The major reason influencing the length of the read cycle is the read cycle of the DRAM (Dynamic Random Access Memory).

For understanding the internal signals inside a microprocessor system, some related issues are briefly described here.

1. L2 Cacheable Cycle

It means that a cycle having a corresponding address inside the L2 Cache (which is a kind of SRAM). During this cycle, the data can be directly read from and written into the L2 Cache instead of the DRAM.

2. Cache HIT/MISS (K HIT/MISS)

Judge whether an address corresponding to a cycle is related to the L2 Cache. If the answer is yes, it is called "Cache HIT"; and if the answer is no, it is called "Cache MISS".

3. ONBDM

Judge whether an address corresponding to a cycle is related to the DRAM. If the answer is yes, the signal ONBDM equals 1. And the cycle will be stopped by a memory controller and a DRAM cycle will be initiated. If the signal ONBDM equals 0, other devices (such as PCI Bus or ISA bus) are responsible for this cycle.

4. Page Hit

This signal means that two neighboring sets of data addresses are inside a same page of the DRAM.

5. Page Miss

This signal means that two neighboring sets of data addresses are not inside a same page of the DRAM.

6. ADS#

This is a control signal from the CPU. This signal represents that the CPU starts a work cycle.

7. Burst Ready

It is a control signal from a chip controller. This signal informs the CPU that the system has completed the present work cycle.

8. Lead Off Time

This means the time interval between the CPU outputting an ADS# and the CPU receiving the first set of data corresponding to this ADS# (that is, Burst Ready is received).

9. RAS# (Row Address Strobe)

This is a control signal related to the DRAMs and an active low signal. That is, when RAS# changes from 1 to 0, according to an address from the Memory Address Bus (MA), the DRAM will read the data from the location corresponding to said address.

10. CAS# (Column Address Strobe)

This is a control signal related to the DRAMs and an active low signal. That is, when CAS# changes from 1 to 0, according to an address from the Memory Address Bus (MA), the DRAM will read the data from the location corresponding to said address.

11. Tag RAM

The Tag RAM is an independent SRAM. The Tag RAM includes the addresses corresponding to all data stored in L2 Cache.

12. EDO/Fast Page Mode DRAMs

The EDO Mode DRAM and the Fast Page Mode DRAM are two different DRAMs. Although the control signals of these two DRAMs are the same, the EDO Mode DRAM is more progressive and needs more advanced technology. In addition, for achieving the same data access, the EDO Mode DRAM requires less time. When the DRAM control signals (for example, CAS#) changes from 0 to 1, the data from the EDO Mode DRAM will still stay in the Memory Bus; whereas, for the same situation, the data from the Fast Page Mode DRAM will disappear when the control signals disappear.

Generally speaking, after the internal control signals of the microprocessor system are decided, the DRAM controller of the microprocessor system starts to work. These control signals comprise the comparison results of some signals. For example, the addresses of the present cycle are compared to identify whether the cycle is L2 Cacheable Cycle (i.e., for KHIT, to identify whether the cycle is related to the SRAM) or whether ONBDM equals 1 (that is, identify whether the cycle is related to DRAM). To identify whether the cycle is Page Hit (where two neighboring sets of data are inside a same page of the DRAM) or Page Miss (where two neighboring sets of data are not inside a same page of the DRAM) is also executed. In addition, the time when the DRAM receives the control signals and the time when the data in the DRAM are read are also to be determined (it is to be noticed that by determining CAS#/RAS#, the memory address can also be determined, and whether CAS#/RAS# is determined depends on Page Hit/Page Miss). Therefore, only after all control signals are stable, the microprocessor will drive the DRAMs. Otherwise, the microprocessor will read the wrong data from the wrong DRAM locations.

With respect to the related technology, the Lead Off time of the DRAM is limited to the applied circuit elements. For example, a 15 ns SRAM is used as the address-storing Tag RAM to serve as a synchronous L2 Cache. Till the second time interval, the correct address can be obtained by the Tag RAM (where the first time interval is for initialing ADS#). After some buffers, combination circuits, delay consideration, and element preset time consideration are incorporated, CAS#/RAS# can be determined in the third time interval. When the EDO/Fast Page Mode DRAMs are used for the memory elements, the total data-reading cycle will be up to 6 time intervals. Even when the faster memory elements are used, concerning the data-reading cycle, only one time interval is reduced.

From the above it is seen that a method for effectively shortening the data-reading cycle in a data reading and writing system is often desired.

SUMMARY OF THE INVENTION

One objective of the present invention is to provide a method for effectively shortening the data-reading cycle in a data reading and writing system.

In a specific embodiment, the present invention provides a method for reading data in a data reading and writing system. The method comprises the steps of:

(1) providing a clock signal for serving as a pulse source of a synchronous signal for the data reading and writing system;

(2) providing an enable signal for activating the data reading and writing system into a data reading cycle;

(3) providing an address signal and decoding the address signal into a memory address signal;

(4) comparing addresses of two successive memory address signals to obtain a comparison signal (5) providing a column address strobe and a row address strobe for obtaining a memory address from the memory address signal, wherein the step of comparing addresses of two successive memory address signals and the step of obtaining a memory address are executed at the same time;

(6) allowing the data reading and writing system to output a memory data output in response to the obtainment of the memory address; and (7) repeating steps (2), (3) & (5) till the data reading procedure is completed.

Certainly, the data reading and writing system can be a microcomputer system. The microcomputer system can comprise a CPU, a DRAM, a SRAM, and a peripheral control circuit. The enable signal can be transmitted from the CPU. The address signal can be transmitted from the CPU. The address signal can be a 32-bit signal. The memory address signal can be at least a 12-bit signal. The step of decoding can decode the address signal which is a 32-bit signal into the memory address signal which is a 12-bit signal, for example.

Certainly, the method can comprise a step of precharge time process executed on the row address signal. This step can be executed between the step (3) and the step (4).

Certainly, the comparison signal can comprise a first comparison signal and a second comparison signal. The first comparison signal can identify whether the address corresponding to the CPU address signal is inside those corresponding to the SRAM. The second comparison signal can identify whether two neighboring memory address signals are related to a same page.

Certainly, the method can further comprise a step of identifying whether the comparison signal is in a first state. This step is executed between the step (2) and the step (3). The step of obtaining memory address can be stopped and the step (4) is re-executed when the comparison signal is in the first state. The first state can comprise the first comparison signal being in a low level and the second comparison signal being in a high level.

Certainly, the column address strobe can be an active low signal. The row address strobe can be an active low signal. The memory address can comprise a column address and a row address.

Certainly, the method can comprise a step of providing a burst ready output after the memory data output is outputted. This step can be executed between the step (5) and the step (6).

Certainly, the data reading cycle can be the time interval between the enable signal is outputted and the burst ready signal is outputted.

The forgoing and other objects, features, and advantages of the invention will be apparent from the following more particular description of a preferred embodiment of the invention, as illustrated in the accompanying drawings.

DETAILED DESCRIPTION OF THE PREFERRED EMBODIMENT

Figure 2:
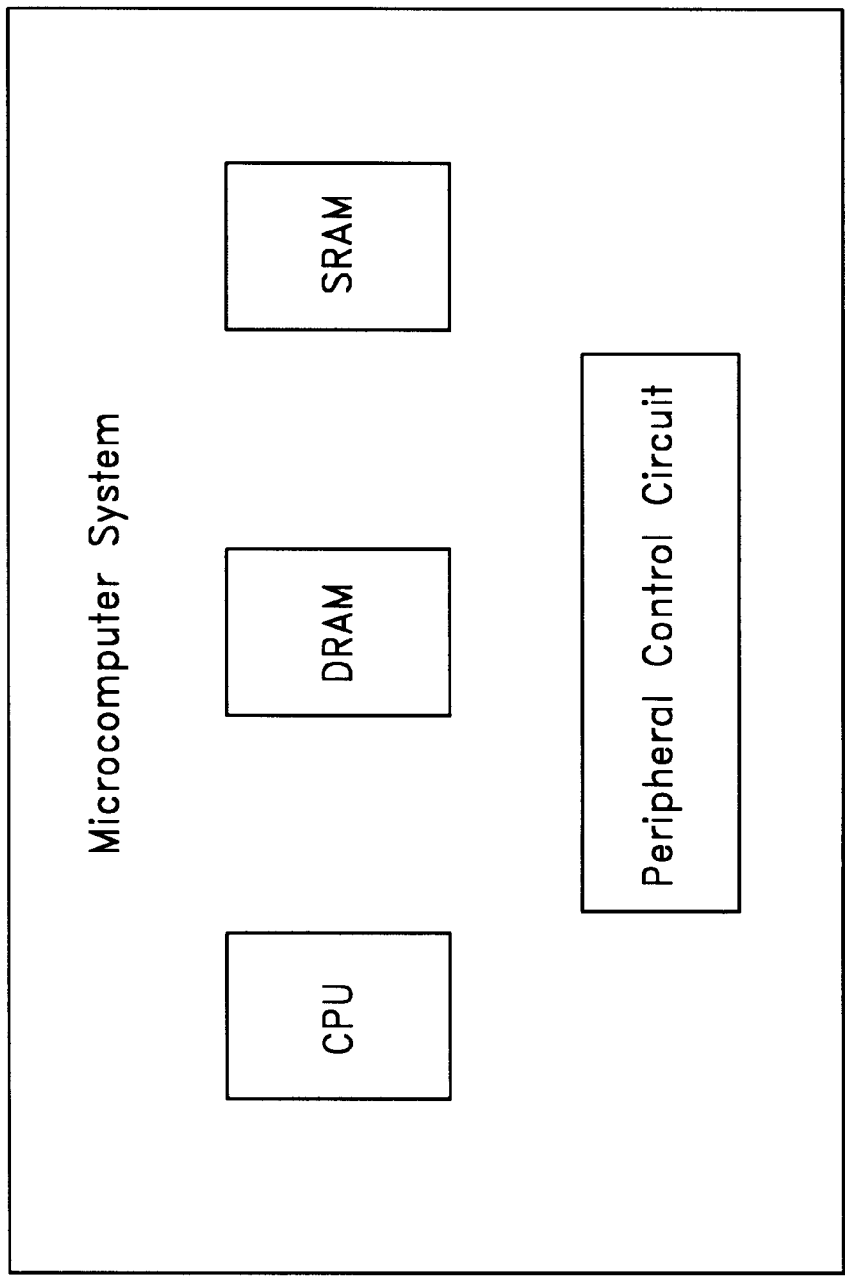
FIG. 2 is a block diagram illustrating a microcomputer system.

FIG. 2 illustrates a microcomputer system including a CPU, a DRAM, a SRAM and a peripheral control circuit.

Generally speaking, before the data reading, a sequence related to the DRAM is outlined as follows.

(1) Determine whether the data reading and writing system is in an idle cycle.
(2) Determine whether the data-reading cycle is related to the SRAM.
(3) Determine whether two neighboring data-reading cycles are inside a same page of the DRAM.

After the above sequence, if the address of the data is related to the DRAM, the read cycle just begins. The above-mentioned process takes a much long time.

With respect to the memory control, there is one feature: the addresses of the successive read cycles are stored in the successive locations. For example, most of the addresses from the CPU of the microprocessor system are inside the same page of the DRAM address.

Figure 1:
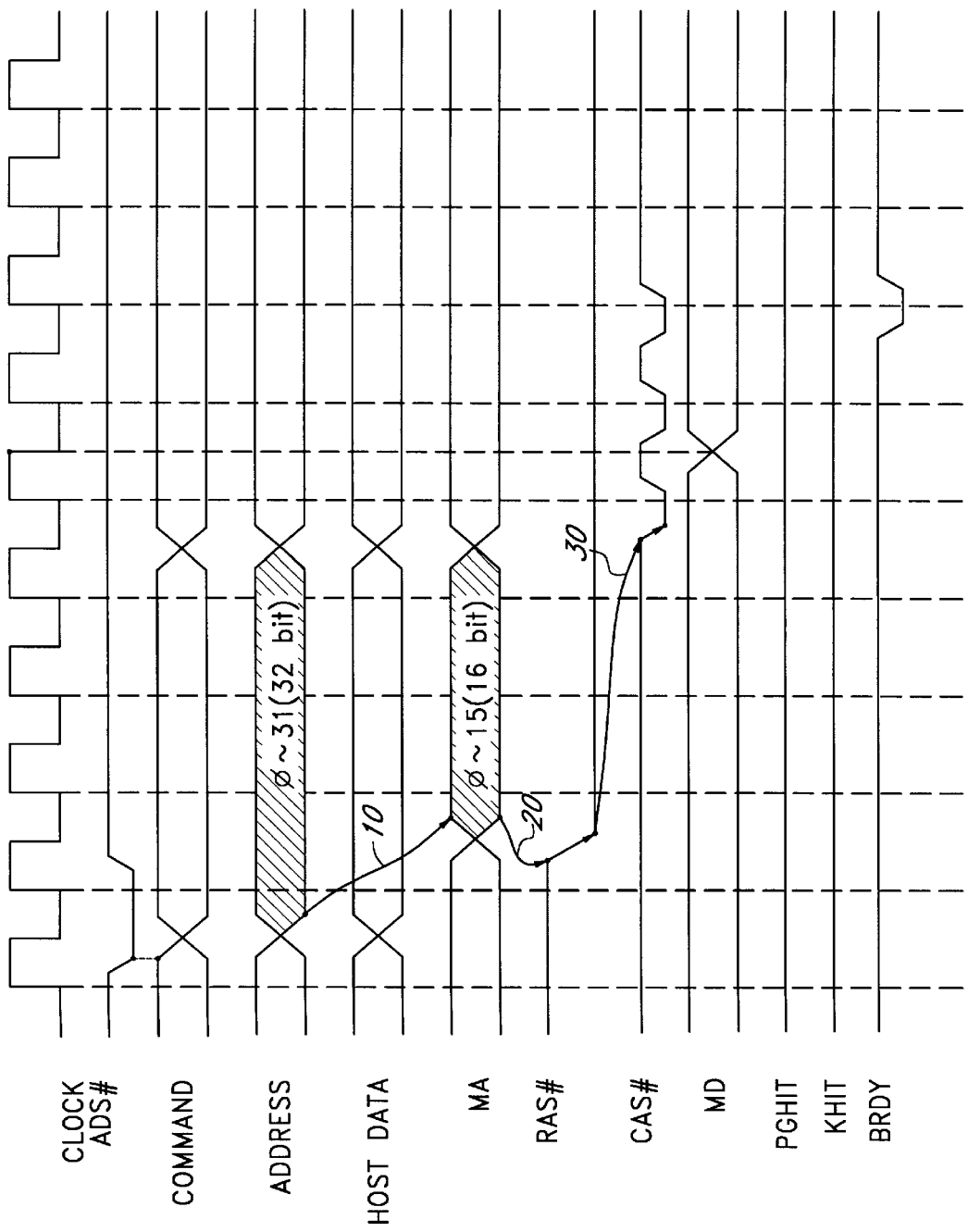
FIG. 1 illustrates a timing diagram related to the data reading of the DRAM according to the present invention.

FIG. 1 illustrates a timing diagram related to the data reading of the DRAM according to the present invention. Some terms in FIG. 1 are briefly explained as follows.

1. L2 Cacheable Cycle
It means that a cycle where a corresponding address is related to the L2 Cache, so during this cycle, the data can be directly read from and written into the L2 Cache instead of the DRAM.

2. Cache HIT/MISS (K HIT/MISS)
Judge whether an address of a cycle is related to the L2 Cache. If the answer is yes, it is called "Cache HIT"; and if the answer is no, it is called "Cache MISS".

3. Page Hit
This signal means that two neighboring sets of data addresses are inside a same page of the DRAM.

4. Page Miss
This signal means that two neighboring sets of data addresses are not inside a same page of the DRAM.

5. ADS#
This is a control signal from the CPU. This signal represents that the CPU starts a work cycle.

6. Burst Ready
It is a control signal from a chip controller. This signal informs the CPU that the system has completed the present work cycle. This signal is an active low signal.

7. RAS# (Row Address Strobe)
This is a control signal related to the DRAMs and is an active low signal. That is, when RAS# changes from 1 to 0, according to an address from the Memory Address Bus (MA), the DRAM will read the data from the location corresponding to said address.

8. CAS# (Column Address Strobe)
This is a control signal related to the DRAMs and is an active low signal. That is, when CAS# changes from 1 to 0, according to an address from the Memory Address Bus (MA), the DRAM will read the data from the location corresponding to said address.

9. COMMAND
The control signal from the CPU is generally a READ or a WRITE command. This signal can control the DRAM to execute the reading or writing operations.

10. ADDRESS
The address signal from the CPU is a 32-bit signal. The address signal can be translated into the column address signal and the row address signal related to the DRAM allocation through DRAM controller.

11. HOST DATA
This is a data signal from/to the CPU.

12. MA (Memory Address)
This is a 12~15 bit signal (depending on the DRAM type used).

13. MD (Memory Data)
This is a data signal from/to the DRAM.

14. CLOCK

This is the clock signal.

Referring to FIG. 1, when the CPU of the computer starts a cycle for reading and writing the data in the DRAM, ADS# changes from the high level to the low level (i.e., from 1 to 0). Then the CPU of the computer transmits the following signals including the COMMAND signal, the ADDRESS signal, and the HOST DATA signal. Taking the PENTIUM system for example, the ADDRESS signal is a 32-bit signal. Whereas, the ADDRESS BUS of the DRAM is only for the 12~15-bit signal. Thus, a decoding process is to be executed so that the ADDRESS signal is converted into the MEMORY ADDRESS (MA). This decoding process will produce a first time delay 10.

The MEMORY ADDRESS signal includes a column address signal and a row address signal. The column address and the row address signal cannot be used by the DRAM immediately. Because the allocation method for the data reading and writing of the DRAM is usually to allocate a large amount of data related to a large amount of addresses (especially for the PENTIUM system), the related method for processing the memory addresses is usually executed after a series of comparison of signals are completed. For example, after every set of data is allocated, Cache HIT/MISS, and Page Hit or Page Miss are first to be decided, and then the next set of data is then allocated. Therefore, if a large amount of data is to be allocated, then a large amount of time is wasted on the waiting for the comparison result.

During the data processing of the DRAM, due to the comparison process and the element characteristic, a second time delay 20 and a third time delay 30 are generated. The present invention applies this feature, the above problem of wasting time for the comparison result can be solved.

The present invention includes the following steps:

(1) Provide a clock signal so that a microcomputer circuit can use the clock signal as a pulse source of a synchronous signal. The microcomputer circuit includes a CPU, a DRAM, a SRAM, and a peripheral control circuit.

(2) The CPU transmits a low-level ADS# signal (an enable signal) so that the microcomputer circuit enters into a data-reading cycle.

(3) The CPU transmits an ADDRESS signal, and the ADDRESS signal is decoded from a 32-bit signal acceptable to the CPU to a 12~15-bit signal acceptable to the DRAM. The MEMORY ADDRESS (MA) is therefore obtained.

(4) Compare two address values of the two successive MEMORY ADDRESS signals so that comparison signals of Cache HIT/MISS and Page Hit or Page Miss are obtained. At the same time, a RAS# and a CAS# are provided so that a memory address is obtained form the ADDRESS signal.

(5) The DRAM outputs the MEMORY DATA after the memory address is obtained.

(6) Repeat the step (2) to the step (5) until the data reading procedure is completed.

In the step (4), obtaining the memory address and comparing the two successive memory addresses are executed at the same time so that the data reading time are shortened in a large scale.

There can be a step executed between the step (3) and the step (4). The step includes a precharge time process for the row address signal so that the third time delay 30 can be produced.

There can also be a step executed between the step (4) and the step (5). The step includes identifying whether the comparison signal is in the Cache HIT or Page MISS state. If the answer is yes, stop obtaining the memory address and re-execute step (4).

There can further be a step executed between step (5) and Step (6). The step includes providing a Burst Ready output after the MEMORY DATA are outputted. The data reading cycle is the time interval between the enable signal is outputted and the BURST READY signal is outputted.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A method for reading data in a data reading and writing system, comprising:

(1) providing a clock signal for use as a pulse source of a synchronous signal for said data making and writing system;

(2) providing an enable signal for activating said data reading and writing system into a data reading cycle;

(3) providing an address signal and decoding said address signal into a memory address signal;

(4) comparing addresses of two successive said respective memory address signals to obtain a comparison signal and providing a column address strobe and a row address strobe for obtaining a memory address from said memory address signal, wherein said comparing addresses of said two successive memory address signals and said obtaining a memory address are executed at the same time and wherein said comparison signal comprises a first comparison signal and a second comparison signal and said first comparison signal identifies whether the address corresponding to said memory address signal is inside those corresponding to a static random access memory;

(5) allowing said data reading and writing system to output a memory data output in response to an obtainment of said memory address;

(6) repeating (2) to (5) until a data reading procedure is completed, and wherein said second comparison signal identifies whether two neighboring memory address signals are related to a same page.

2. A method as set forth in claim 1 wherein said data reading and writing system is a microcomputer system.

3. A method as set forth in claim 2 wherein said microcomputer system comprises a CPU, a DRAM, the SRAM, and a peripheral control circuit.

4. A method as set forth in claim 3 wherein said enable signal is transmitted from said CPU.

5. A method as set forth in claim 3 wherein said address signal is transmitted from said CPU.

6. A method as set forth in claim 1 wherein said address signal is a 32-bit signal.

7. A method as set forth in claim 6 wherein said memory address signal has a width in the range of 12 bits to 15 bits.

8. A method as set forth in claim 1 wherein said step of decoding decodes said address signal which is a 32-bit signal into said memory address signal which is 12 bits to 15 bits in width.

9. A method as set forth in claim 1, further comprising a step of precharge time processing for said row address signal.

10. A method as set forth in claim 1, further comprising a step of identifying whether said comparison signal is in a first state in order to stop said step of obtaining memory address and re-execute said step (4) when said comparison signal is in said first state.

11. A method as set forth in claim 10 wherein said first state comprises said first comparison signal being in a low level and said second comparison signal being in a high level.

12. A method as set forth in claim 1 wherein said column address strobe is an active low signal.

13. A method as set forth in claim 1 wherein said row address strobe is an active low signal.

14. A method as set forth in claim 1 wherein said memory address comprises a column address and a row address.

15. A method as set forth in claim 1, further comprising a step of providing a burst ready output after said memory data output is outputted, and wherein said data reading cycle is the time between said enable signal as outputted and said burst ready signal as outputted.

16. A method of reading data in a data reading and writing system, comprising:
   (1) providing a clock signal for serving as a pulse source of a synchronous signal for said data reading and writing system;
   (2) providing an enable signal for activating said data reading and writing system into a data reading cycle;
   (3) providing an address signal and decoding said address signal into a memory address signal;
   (4) comparing addresses of two successive said respective memory address signals to obtain a comparison signal and providing a column address strobe and a row address strobe for obtaining a memory address from said memory address signal, wherein said comparing addresses of said two successive memory address signals and said obtaining a memory address are executed at the same time, and wherein said comparison signal comprises a first comparison signal and a second comparison signal and said first comparison signal identifies whether the address corresponding to said memory address signal is inside those corresponding to a static random access memory;
   (5) allowing said data reading and writing system to output a memory data output in response to obtaining said memory address; and
   (6) transmitting a burst-ready output after said memory data output is output;
   (7) repeating acts (2) to (6) until a data reading procedure is completed and wherein said reading cycle is a time interval measured from when said enable signal is output to when said burst-ready signal is output, and wherein said second comparison signal identifies whether two neighboring memory address signals are related to a same page.

* * * * *